United States Patent
Mintgen et al.

(10) Patent No.: US 7,237,471 B2
(45) Date of Patent: Jul. 3, 2007

(54) CONTINUOUSLY LOCKABLE ADJUSTMENT DEVICE

(75) Inventors: Rolf Mintgen, Thuer (DE); Paul Muders, Rhens (DE); Wilhelm Schwab, Neuwied (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 11/077,095

(22) Filed: Mar. 10, 2005

(65) Prior Publication Data

US 2005/0217474 A1 Oct. 6, 2005

(30) Foreign Application Priority Data

Mar. 31, 2004 (DE) .................. 10 2004 015 811

(51) Int. Cl.
*F15B 13/04* (2006.01)
*F16F 13/00* (2006.01)
(52) U.S. Cl. .................. 91/422; 92/15; 92/169.1; 92/184
(58) Field of Classification Search .................. 91/422; 92/15, 169.1, 181 R, 181 P, 182–185
See application file for complete search history.

(56) References Cited

U.S. PATENT DOCUMENTS

| 4,041,840 A | * | 8/1977 | Zirps ........................... 91/422 |
| 4,166,612 A | * | 9/1979 | Freitag et al. .............. 188/300 |
| 4,588,054 A | * | 5/1986 | LeBaron ...................... 92/182 |
| 5,623,861 A | * | 4/1997 | Ward et al. ................... 91/422 |

* cited by examiner

*Primary Examiner*—Thomas E. Lazo
(74) *Attorney, Agent, or Firm*—Cohen Pontani Lieberman & Pavane LLP

(57) ABSTRACT

A continuously lockable adjustment device for immobilizing elements which are movable relative to each other includes a stepped cylinder having a first cylinder step and a second cylinder step, the second cylinder step having a larger cross-sectional area than the first cylinder step, a stepped piston having a first piston step guided in the first cylinder step and a second piston step guided in the second cylinder step, and a piston rod connected to the piston opposite the first piston step and extending sealed off out an end of the cylinder. The cylinder has a first working space and a second working space separated by the piston and filled with a working fluid in which the piston can be displaced axially, thereby displacing working fluid from one working space to the other working space.

16 Claims, 2 Drawing Sheets

CONTINUOUSLY LOCKABLE ADJUSTMENT DEVICE

BACKGROUND OF THE INVENTION

1. Field of the Invention

The invention relates to a continuously lockable adjustment device for the immobilization of structural elements movable relative to one another, with a cylinder which has two working spaces separated from one another by means of a piston and is filled with a working fluid and in which the piston can be displaced axially. In the event of the displacement of the piston, working fluid can be transferred from one working space into the other working space. A piston rod connected to the piston is guided, sealed off, out of the cylinder on one end.

2. Description of the Related Art

An adjustment device of this type as a door immobilizer for motor vehicles is known. It has a cylinder which is filled with a fluid and on the inner wall of which a piston connected to a piston rod is guided in a sealing-off manner. The cylinder inner space is subdivided into two working spaces, and a locking valve actuable from outside and having a releasing tappet led through the piston rod is provided for locking in a desired position. On account of this, the adjustment device is of complicated construction and has a large number of components.

A further known adjustment device is a continuous hydraulic door immobilizer for motor vehicle doors, which has a cylinder and a piston rod movable relative to the cylinder. In the cylinder, two working chambers are separated from one another by means of a separating piston having connecting ducts which allow the flow of an oil from one working chamber into the other working chamber. The connecting ducts, which are arranged laterally in the separating piston traversed centrally by the piston rod, are provided with valves which are closed when the adjustment device is in the state of rest. The piston rod is mounted on each of the two sides of the separating piston in a sealing and guiding system, respectively. Such an adjustment device not only has a comparatively high weight, but also requisite complicated sealing-off.

SUMMARY OF THE INVENTION

Proceeding from the prior art, the object of the present invention is to provide an adjustment device which is of simpler construction and has a lower weight.

According to the invention, the cylinder is a stepped cylinder having a first cylinder step with a smaller cross-sectional area and a second cylinder step with a larger cross-sectional area, and the piston is a stepped piston with a first piston step guided in the first cylinder step and facing away from the piston rod and with a second piston step guided in the second cylinder step and facing the piston rod. Owing to the stepped-cylinder and stepped-piston arrangements, the adjustment device according to the invention has a highly compact construction, and, in order to separate the working spaces, there is no need to provide a two-sided piston-rod arrangement on the piston; it is possible to provide a piston rod which is mounted on the piston on only one side and which does not penetrate the stepped-piston arrangement. This makes it easier, inter alia, to seal off the adjustment device internally and mitigates the risk of undesirable leakages, this being advantageous particularly in the case of an adjustment device with a high internal pressure. The weight of the adjustment device according to the invention is especially low and the construction is simple. The assembly of the adjustment device is consequently also simplified. An adjustment device according to the invention, because of its compact construction and comparatively low weight, is especially suitable for the adjustment and detention of structural elements on motor vehicles, for example motor vehicle bonnets, flaps, lids, screens, double-wing doors, retractable headlamps and folding tops, in particular for the adjustment and detention of motor vehicle doors. In and folding tops, in particular for the adjustment and detention of motor vehicle doors. In this context, the high durability and insusceptibility to wear of the adjustment device according to the invention are also demonstrated to full advantage.

According to an advantageous development of the invention, the effective area of the first piston step and the effective area of the second piston step are of equal size. This equalization of effective areas is advantageous particularly in the case of a high internal pressure of the adjustment device. The equalization of effective areas prevents an unwanted displacement of the piston in the cylinder which is caused by a variation in the volume of the working fluid.

The construction of the adjustment device is further simplified and the number of its components reduced when, according to another advantageous development of the invention, the first working space is delimited by the first piston step and by the first cylinder step closed on its side facing away from the piston.

Furthermore, it is especially advantageous for a simple production capability of the adjustment device when, according to another development of the invention, the second working space is delimited by the second piston step and by the second cylinder step closed on its side facing away from the piston and is penetrated by the piston rod.

It would be conceivable for the cylinder to be a workpiece appropriately machined in order to obtain the stepped-cylinder arrangement. However, the cylinder can be produced especially cost-effectively and without much outlay when, according to another advantageous development of the invention, it has a pressure tube with an insert part supported on the inner wall of the pressure tube and forming the first cylinder step. Moreover, the insert part ensures a reliable and permanent sealing-off of the first working space of the adjustment device.

In this case, cylinder production is especially cost-effective, and at the same time the first cylinder step is secured reliably and permanently, when, according to an advantageous development of the invention, the pressure tube has beads for fixing the insert part. The beads may be produced, for example, by the pinching of the pressure tube.

Particularly for the compensation of fluctuations in the volume of the working fluid owing to temperature changes, it is advantageous if, according to another development of the invention, the cylinder has, on its end facing away from the piston rod, a volume equalization device for the working fluid. Moreover, if appropriate, an influence of the piston-rod volume on the working fluid in the event of a displacement of the piston can consequently also be compensated.

The volume equalization device can in this case be integrated completely into the cylinder in an especially simple way when, according to an advantageous development of the invention, a passage in or on the insert part is provided which connects the first working space and/or the second working space to an equalization space of the volume equalization device, the equalization space having working fluid, and through which working fluid can flow. Thus, by existing components being utilized, the equalization space having the working fluid can be delimited by the insert part and by a portion of the inner wall of the cylinder.

Air volumes possibly included in the working fluid may generate undesirable noises in the event of a movement of the working fluid. To avoid these noises, a high internal pressure, for example of an order of magnitude of 60 to 80 bar, is provided in the adjustment device; the internal pressure is in this case the pressure under which the working fluid is maintained. For a simple construction of the adjustment device, the volume equalization device for the working fluid also generates and maintains the internal pressure of the adjustment device. For this purpose, according to an advantageous development of the invention, the volume equalization device has in a simple way a separating piston which separates the equalization space for the working fluid from a pressure space and is guided in the cylinder and which, from its end facing the pressure space, is prestressed towards the working fluid in the equalization space.

For prestressing, it is basically conceivable to use any desired means, for example mechanical, hydraulic or pneumatic. However, according to an advantageous development of the invention, a permanent prestress can be achieved in a simple way if, for prestressing the separating piston, a mechanical compression spring and/or a pressure fluid is arranged in the pressure space.

According to another advantageous development of the invention, cost-effectively and for functional reliability, the working fluid is an incompressible liquid and the pressure fluid is a gas. The incompressible liquid is preferably an oil, in particular a hydraulic oil.

For an especially compact construction of the adjustment device and for short flow paths of the working fluid, it is advantageous, according to another development of the invention, if the piston is a hollow piston through which the working fluid can flow. The moved mass of the piston can consequently also be reduced at the same time.

It would be conceivable, for example, for the working fluid to flow through the hollow piston in only one direction of flow, to be precise either from the first working space into the second, or vice versa, whereas the opposite flow takes place, for example, via lateral ducts on the piston. However, for an equal action of the adjustment device in both possible directions of adjustment, which are characterized by a retraction or extension of the piston rod into or out of the cylinder, the piston has two chambers. A first chamber has an inlet orifice to the first working space, the inlet orifice being closable by means of a first valve, and a second chamber has an inlet orifice to the second working space, the inlet orifice being closable by means of a second valve. Preferably, the valves are arranged centrically in the piston, so that possible unbalances are avoided.

For the controlled throughflow of working fluid, according to an advantageous development of the invention, the piston has, in a region between the first piston step and the second piston step, outlet orifices to a piston-step interspace delimited by the piston and by the inner wall of the cylinder.

According to another advantageous development of the invention, in a simple way, both one of the piston steps or the two piston steps can be sealed off with respect to the cylinder and the flow of the working fluid controlled when the first piston step and/or the second piston step are/is sealed off with respect to the inner wall of the cylinder by means of a non-return valve.

In order to cut out the action of the adjustment device in an end region and thus provide a function-free region which, for example, simplifies the closing of a motor vehicle door, it is particularly advantageous, according to another development of the invention, if the cylinder has bridging grooves, effective in the pushed-in position of the piston rod, for the first piston step and the second piston step, for the unimpeded throughflow of working fluid.

An exemplary embodiment of the invention is illustrated in the drawing and is explained in more detail below.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
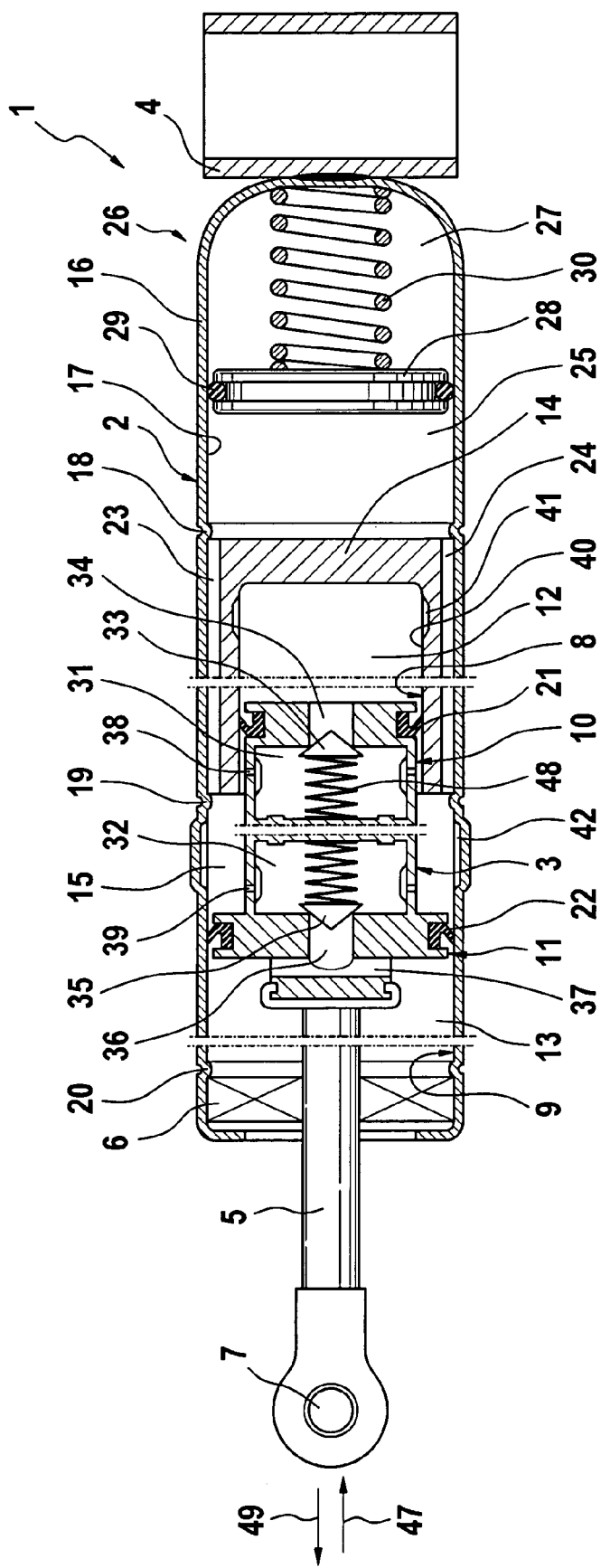
FIG. 1 shows a sectional side view of a continuously lockable adjustment device.

The continuously lockable adjustment device 1 shown in FIG. 1, forming a door immobilizer for a motor vehicle door, has a piston 3 arranged axially displaceably in a cylinder 2. The cylinder 2 is closed on one end and on this closed side is connected firmly to a sleeve 4 which, when the adjustment device 1 is in the installed state, is guided on a structural element, not illustrated here, to be precise a bearing bolt on a motor vehicle body. On the end of the cylinder 2 which is located opposite the sleeve 4, a piston rod 5 connected to the piston 3 extends out of the cylinder 2; a seal 6, in which the piston rod 5 is guided movably, serves for sealing off the cylinder 2. The piston rod 5 can be connected by means of a lug 7 to a further structural element, not illustrated here, to be precise a bearing bolt on the motor vehicle door. The adjustment device 1 thus serves for immobilizing the motor vehicle door and motor vehicle body of a motor vehicle as structural elements movable relative to one another.

The cylinder 2 is designed as a stepped cylinder and has a first cylinder step 8 and a second cylinder step 9, the cross-sectional area of the first cylinder step 8 being smaller than the cross-sectional area of the second cylinder step 9. Matching with the stepped cylinder, the piston 3 is designed as a stepped piston with a first piston step 10, which faces away from the piston rod 5 and is guided in the first cylinder step 8, and with a second piston step 11, which is guided in the second cylinder step 9. The effective area of the first piston step 10 and the effective area of the second piston step 11 are of equal size. The piston 3 separates two working spaces 12, 13 of the adjustment device 1, a first working space 12 being delimited by the first piston step 10 and by the first cylinder step 8 which is closed on its side facing away from the piston 3 and is formed by an insert part 14; the second working space 13 is delimited by the second piston step 11 and by the second cylinder step 9 which is penetrated by the piston rod 5 and on its end facing away from the piston 3 is closed by means of the seal 6 for the piston rod 5. Between the piston steps 10, 11 is located an annular piston-step interspace 15 which, like the working spaces 12, 13, is filled with an oil as working fluid.

The insert part 14 is inserted into the cylinder 2 designed as a pressure tube 16 and is supported on the inner wall 17 of the pressure tube 16. To fix the insert part 14 in the pressure tube 16, the latter has beads 18, 19. The seal 6 for the piston rod 5 is also retained in the cylinder 2 by means of a corresponding bead 20. The piston steps 10, 11 are sealed off and guided in the cylinder 2 in each case by means of a grooved ring designed as a non-return valve 21, 22. The insert part 14 is provided on its circumference with duct-shaped passages 23, 24 which connect the working spaces 12, 13 via the piston-step interspace 15 to an equalization space 25 of a volume equalization device 26 for the working fluid. The volume equalization device 26 is provided, as well as the equalization space 25, with a pressure space 27 having a gaseous pressure fluid, the pressure space 27 and the equalization space 25 being separated by means of a separating piston 28 guided in the cylinder 2. For sealing-off and guidance, the separating piston 28 possesses a toroidal sealing ring 29 bearing against the inner wall 17 of the pressure tube 16. The pressure space 27 also has a mechanical compression spring 30 which is designed as a helical spring and which is supported on the inner wall of the cylinder 2 and prestresses the separating piston 28.

The piston 3 is a hollow piston with two chambers 31, 32, a first chamber 31 having an inlet orifice 34 to the first working space 12, this inlet orifice being closable by means of a first valve 33, and a second chamber 32 having an inlet orifice 36 to the second working space 13, this inlet orifice being closable by means of a second valve 35, via a passage duct 37 arranged in the region of a connection of the piston rod 5 to the piston 3. Moreover, the chambers 31, 32 of the piston 3 have, in a region between the first piston step 10 and the second piston step 11, outlet orifices 38, 39 to the piston-step interspace 15 delimited by the piston 3 and by the inner wall of the cylinder 2. The cylinder 2 has, on the inner wall 40 of the insert part 14, bridging grooves 41 for the first piston step 10 and, on the inner wall 17 of the pressure tube 16, bridging grooves 42 for the second piston step 11, for the unimpeded throughflow of working fluid in the position of the piston rod 5 in which the latter is pushed into the cylinder 2.

Figure 2:
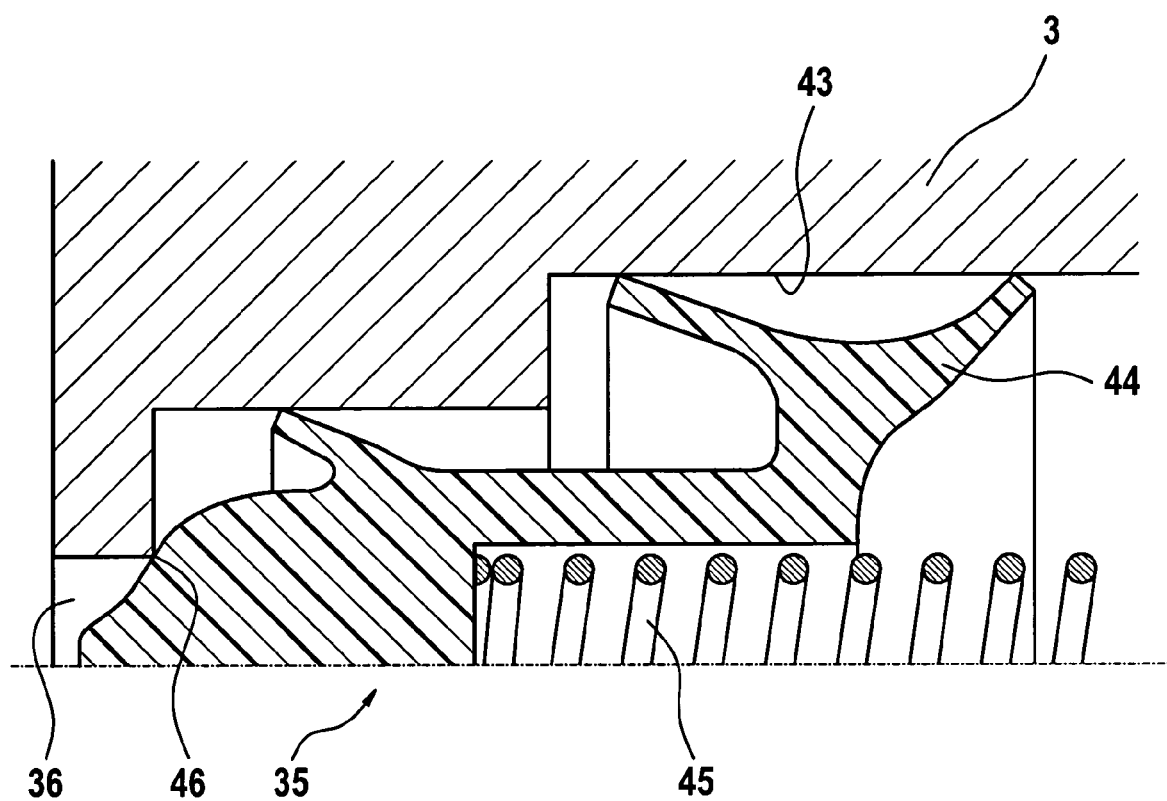
FIG. 2 shows an enlarged view of a portion of a valve from FIG. 1 in the form of a detail.

FIG. 2 shows, enlarged, a portion of the valve 35 in the piston 3, this valve closing the inlet orifice 36 to the second working space. The valve 35 has a slide 44 bearing against the inner wall 43 of the piston 3 and is prestressed against a valve seat 46 by means of a valve spring 45.

The functioning of the adjustment device 1 is described, with reference to FIG. 1, as follows: in the event of the action of a compression force, symbolized by an arrow 47, on the piston rod 5, the pressure of the working fluid in the first working space 12 rises. This pressure also acts on the valve 33 in the inlet orifice 34 of the piston 3 to the first working space 12. When the force on the valve 33 caused by the pressure is higher than the force of a valve spring 48 closing the valve 33, the valve 33 opens and working fluid flows via the outlet orifices 38 of the first chamber 31 of the piston 3, via the piston-step interspace 15 and via the non-return valve 22 on the tension side of the piston 3 into the second working space 13 which is the working-fluid space on the tension side. Due to the flow of the working fluid, the piston rod 5 can be moved together with the piston 3. When the valve 33 has opened in the event of the movement of the piston rod 5, the dynamic pressure of the working fluid acts on the end face of the valve 33 and keeps the latter open until the movement of the piston rod 5 is stopped. The valve 33 thereafter closes again due to the force exerted by the valve spring 48. A corresponding behavior in the opposite direction can be brought about by the application of a tensile force, symbolized by an arrow 49, on the piston rod 5. In this case, the valve tension stage (valve 35) is responsible for the cut-through. Fluctuations in the working-fluid volume due to temperature changes are compensated by means of the prestressed separating piston 28 of the volume equalization device 26. At the same time, the volume equalization device 26 generates a high internal pressure in the adjustment device 1, in order to avoid noises during the flow of the working fluid through the valves, orifices and passages, such noises being caused by small air volumes possibly present in the working fluid.

In order, in the event of the retraction of the piston rod 5 into the cylinder 2, to avoid a push-out force due to a pressure rise of the working fluid caused by the volume of the piston rod 5 additionally introduced into the cylinder 2, the area of the compression stage is as large as the area of the tension stage, reduced by the amount of the piston-rod cross-sectional area, that is to say the effective area of the first piston step and the effective area of the second piston step are of equal size.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A continuously lockable adjustment device for immobilizing elements which are movable relative to each other, said device comprising:
   a stepped cylinder having a first cylinder step and a second cylinder step, the second cylinder step having a larger cross-sectional area than the first cylinder step;
   a stepped piston comprising a first chamber and a second chamber, the piston having a first piston step guided in the first cylinder step and a second piston step guided in the second cylinder step; and
   a piston rod connected to the piston opposite the first piston step and extending sealed off out an end of the cylinder;
   wherein the cylinder has a first working space and a second working space separated by the piston and filled with a working fluid in which the piston can be displaced axially, thereby displacing working fluid from one working space to the other working space;
   wherein the piston is a hollow piston through which the working fluid can flow; and
   wherein the first chamber has an inlet orifice connected to the first working space and closable by a first valve and the second chamber has an inlet orifice connected to the second working space and closable by a second valve.

2. The adjustment device of claim 1 wherein the first piston step and the second piston step each have an effective area, the effective areas of the piston steps being equal.

3. The adjustment device of claim 1 wherein the second cylinder step has a closed end, the second working space being bounded by the second working space and the closed end of the second cylinder step, the piston rod passing through the closed end of the second cylinder step.

4. The adjustment device of claim 1 wherein the cylinder comprises a pressure tube and an insert supported in the pressure tube, the insert forming the first cylinder step.

5. A continuously lockable adjustment device for immobilizing elements which are movable relative to each other, said device comprising:
   a stepped cylinder having a first cylinder step and a second cylinder step, the second cylinder step having a larger cross-sectional area than the first cylinder step, wherein the first cylinder step has a closed end;
   a stepped piston having a first piston step guided in the first cylinder step and a second piston step guided in the second cylinder step; and
   a piston rod connected to the piston opposite the first piston step and extending sealed off out an end of the cylinder;
   wherein the cylinder has a first working space and a second working space separated by the piston and filled with a working fluid in which the piston can be displaced axially, thereby displacing working fluid from one working space to the other working space; and
   wherein the first working space is bounded by the first piston step and the closed end of the first cylinder step.

6. The adjustment device of claim 5 wherein the piston is a hollow piston through which the working fluid can flow.

7. The adjustment device of claim 6 wherein the piston comprises a first chamber and a second chamber, the first chamber having an inlet orifice connected to the first working space and closable by a first valve the second chamber having an inlet orifice connected to the second working space and closable by a second valve.

8. The adjustment device of claim 6 further comprising a piston-step interspace between the first piston step and the second cylinder step, the piston further comprising at least one outlet orifice connecting each said chamber to the piston-step interspace.

9. The adjustment device of claim 6 further comprising a non-return valve formed as a seal between at least one of said first and second piston steps and a respective at least one of said first and second cylinder steps.

10. A continuously lockable adjustment device for immobilizing elements which are movable relative to each other, said device comprising:
    a stepped cylinder comprising a pressure tube and an insert supported in the pressure tube, the cylinder having a first cylinder step and a second cylinder step, the second cylinder step having a larger cross-sectional area than the first cylinder step, wherein the insert forms the first cylinder step and the pressure tube is formed with beads for fixing the inserts;
    a stepped piston having a first piston step guided in the first cylinder step and a second piston step guided in the second cylinder step; and
    a piston rod connected to the piston opposite the first piston step and extending sealed off out an end of the cylinder;
    wherein the cylinder has a first working space and a second working space separated by the piston and filled with a working fluid in which the piston can be displaced axially, thereby displacing working fluid from one working space to the other working space.

11. A continuously lockable adjustment device for immobilizing elements which are movable relative to each other, said device comprising:
    a stepped cylinder comprising a pressure tube and an insert supported in the pressure tube, the cylinder having a first cylinder step and a second cylinder step, the second cylinder step having a larger cross-sectional area than the first cylinder step, wherein the insert forms the first cylinder step;
    a stepped piston having a first piston step guided in the first cylinder step and a second piston step guided in the second cylinder step;
    a piston rod connected to the piston opposite the first piston step and extending sealed off out an end of the cylinder and;
    a volume equalization device in the cylinder at an end opposite from the piston rod, the volume equalization device comprising an equalization space filled with a working fluid;
    wherein the cylinder has a first working space and a second working space separated by the piston and filled with working fluid in which the piston can be displaced axially, thereby displacing working fluid from one working space to the other working space.

12. The adjustment device of claim 11 wherein the insert comprises a passage connecting the equalization space to one of the first and second working spaces.

13. The adjustment device of claim 11 wherein the equalization device further comprises a separating piston which separates the equalization space from a pressure space, said separating piston being guided in said cylinder and being loaded toward the equalization space.

14. The adjustment device of claim 13 further comprising a compression spring in said pressure space for loading the separating piston toward the equalization space.

15. The adjustment device of claim 13 further comprising a gas in said pressure space for loading the separating piston toward the equalization space, said working fluid being an incompressible liquid.

16. A continuously lockable adjustment device for immobilizing elements which are movable relative to each other, said device comprising:
    a stepped cylinder having a first cylinder step and a second cylinder step, the second cylinder step having a larger cross-sectional area than the first cylinder step;
    a stepped piston having a first piston step guided in the first cylinder step and a second piston step guided in the second cylinder step; and
    a piston rod connected to the piston opposite the first piston step and extending sealed off out an end of the cylinder;
    wherein the cylinder has a first working space and a second working space separated by the piston and filled with a working fluid in which the piston can be displaced axially, thereby displacing working fluid from one working space to the other working space; and
    wherein each of said first and second cylinder steps has at least one bypass groove which is effective to bypass working fluid around each of said first and second piston steps when the piston rod is pushed into the cylinder.

* * * * *